(12) United States Patent
Thakur et al.

(10) Patent No.: US 8,856,670 B1
(45) Date of Patent: Oct. 7, 2014

(54) TECHNIQUE FOR CUSTOMIZING A USER INTERFACE

(75) Inventors: Amritanshu Thakur, Burlington, MA (US); Arthur J. Correa, North Chelmsford, MA (US); Holly Scatamacchia, Hampton, NH (US)

(73) Assignee: Intuit Inc., Mountain View, CA (US)

( * ) Notice: Subject to any disclaimer, the term of this patent is extended or adjusted under 35 U.S.C. 154(b) by 819 days.

(21) Appl. No.: 12/547,319

(22) Filed: Aug. 25, 2009

(51) Int. Cl.
*G06F 3/048* (2013.01)

(52) U.S. Cl.
USPC ............................ 715/765; 715/762; 715/747

(58) Field of Classification Search
CPC ....................................................... G06F 9/545
USPC ........... 715/747, 734; 345/736, 737, 738, 733
See application file for complete search history.

(56) References Cited

U.S. PATENT DOCUMENTS

| | | | |
|---|---|---|---|
| 5,619,632 A * | 4/1997 | Lamping et al. ............... | 345/441 |
| 5,995,106 A * | 11/1999 | Naughton et al. ............. | 715/854 |
| 6,564,170 B2 * | 5/2003 | Halabieh ........................ | 702/181 |
| 6,693,651 B2 * | 2/2004 | Biebesheimer et al. ....... | 715/837 |
| 6,901,555 B2 * | 5/2005 | Hida et al. ..................... | 715/734 |
| 6,981,040 B1 * | 12/2005 | Konig et al. ................... | 709/224 |
| 7,069,318 B2 * | 6/2006 | Burbeck et al. ............... | 709/224 |
| 7,203,701 B1 * | 4/2007 | Packebush et al. ............ | 1/1 |
| 7,203,925 B1 * | 4/2007 | Michael et al. ................ | 717/109 |
| 7,316,001 B2 * | 1/2008 | Gold et al. ..................... | 717/108 |
| 7,440,955 B2 * | 10/2008 | Khandelwal et al. .......... | 1/1 |
| 7,451,162 B2 * | 11/2008 | Hess ............................... | 1/1 |
| 7,461,043 B2 * | 12/2008 | Hess ............................... | 706/46 |
| 7,480,867 B1 * | 1/2009 | Racine et al. .................. | 715/744 |
| 7,512,929 B2 * | 3/2009 | Sangal et al. .................. | 717/100 |
| 7,519,542 B1 * | 4/2009 | Waingold ....................... | 705/7.11 |
| 7,526,771 B2 * | 4/2009 | Roman et al. .................. | 719/316 |
| 7,676,761 B2 * | 3/2010 | Oliver et al. ................... | 715/803 |
| 7,720,774 B2 * | 5/2010 | Sawada .......................... | 706/25 |
| 7,865,820 B2 * | 1/2011 | Sauer et al. .................... | 715/234 |
| 7,895,530 B2 * | 2/2011 | Leavitt et al. .................. | 715/810 |
| 7,932,907 B2 * | 4/2011 | Nachmanson et al. ........ | 345/440 |
| 7,949,964 B2 * | 5/2011 | Vimme .......................... | 715/853 |
| 7,991,841 B2 * | 8/2011 | Anderson et al. ............. | 709/205 |
| 8,020,104 B2 * | 9/2011 | Robarts et al. ................. | 715/744 |
| 8,024,660 B1 * | 9/2011 | Quinn et al. ................... | 715/745 |
| 2004/0044585 A1 * | 3/2004 | Franco ............................ | 705/26 |
| 2008/0065685 A1 * | 3/2008 | Frank ............................. | 707/102 |
| 2009/0043489 A1 * | 2/2009 | Weidner ......................... | 701/201 |
| 2010/0306216 A1 * | 12/2010 | Andersen et al. ............. | 707/759 |
| 2010/0312386 A1 * | 12/2010 | Chrysanthakopoulos et al. ............................. | 700/246 |

OTHER PUBLICATIONS

Kilat, Kyle et al., "Technique for Customizing Displayed Content", U.S. Appl. No. 12/197,557, filed Aug. 25, 2008.

* cited by examiner

*Primary Examiner* — William Titcomb
(74) *Attorney, Agent, or Firm* — Park, Vaughan, Fleming & Dowler LLP; Steven E. Stupp

(57) ABSTRACT

A customization technique that provides a customized user interface in software to a user based on user behaviors while using the user interface during one or more sessions is described. In this customization technique, a usage pattern of the user is determined from the user behaviors, and a user-specific customization of the user interface is generated based on the determined usage pattern. Note that determining the usage pattern may involve generating a directed graph in which vertices correspond to visual components in the user interface and edges between vertices correspond to user behaviors. Then, the user interface in a current release of the software is customized based on the user-specific customization. For example, the customized user interface may include: only a subset of the visual components; a different order of the visual components; and/or a visual component associated with a set of operations.

22 Claims, 7 Drawing Sheets

TECHNIQUE FOR CUSTOMIZING A USER INTERFACE

BACKGROUND

The present disclosure relates to a technique for customizing user interfaces, and in particular, to a technique for customizing user interfaces based on usage patterns determined from user behaviors.

When presenting information to a user, it is often challenging to make certain the information is easy to understand and use. These challenges are even more significant in environments where the information is changing based on user actions. For example, user interfaces in software applications typically include a number of functions. However, as the number of functions grows, it becomes increasingly difficult for users to find desired functions. Consequently, most users are typically only aware of and only use a small subset of the capabilities of a given software application. Furthermore, the need to maintain a familiar (albeit crowded) user interface prevents software developers from adding new features to or otherwise improving user interfaces.

In addition, changes to a user interface are often based on the aggregate behavior of multiple users over a period of time (for example, based on user testing in focus groups). However, these changes typically reflect the needs of the average user, as opposed to those of a given user. Moreover, because the changes are usually implemented at discrete times, such as when a new version of a software application is released, needed modifications are typically implemented slowly. These difficulties can reduce user efficiency when using the software application, and can consequently decrease user satisfaction.

SUMMARY

One embodiment of the present disclosure relates to a computer system that customizes a user interface. During operation, the computer system receives information associated with user behaviors when a user interacts with the user interface, where the user interface is associated with a current release of software. Then, the computer system determines a usage pattern of the user from the user behaviors, and generates a user-specific customization of the user interface based on the determined usage pattern. Next, the computer system customizes the user interface in the current release of the software based on the user-specific customization.

Note that the user behaviors may occur during multiple sessions in which the user interacts with the user interface.

In some embodiments, determining the usage pattern involves generating a directed graph in which vertices correspond to visual components in the user interface and edges between vertices correspond to user behaviors. This directed graph may include weights associated with at least some of the edges, where a given weight indicates a frequency of a user behavior corresponding to a given edge in one or more sessions during which the user interacts with the user interface. Moreover, determining the usage pattern may involve identifying one or more paths through the directed graph, where a given path starts at a first vertex and ends at a second vertex. Furthermore, for the given path, generating the user-specific customization may involve selecting a shorter path through the directed graph from the first vertex to the second vertex. Additionally, for the given path, customizing the user interface may involve presenting a visual component in the user interface corresponding to the selected shorter path, where the visual component corresponds to a set of operations that are performed when the visual component is activated by the user.

In some embodiments, generating the user-specific customization involves selecting a subset of the visual components in the directed graph that includes one or more visual components, and customizing the user interface involves presenting the selected subset of the visual components and excluding the remaining visual components. Alternatively or additionally, generating the user-specific customization involves selecting a subset of the visual components in the directed graph that includes one or more visual components, and customizing the user interface involves changing positions in the user interface of the selected subset of the visual components. Moreover, an order of the presented subset of the visual components may be based on frequencies of use, by the user, of the visual components and/or may be based on an order of usage of the visual components in one or more paths through the directed graph.

Another embodiment provides a method including at least some of the above-described operations.

Another embodiment provides a computer-program product for use in conjunction with the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a computer system, a method and a computer-program product (e.g., software) for use with the computer system are described. These embodiments provide a customized user interface in software to a user based on user behaviors while using the user interface during one or more sessions. In particular, a usage pattern of the user is determined from the user behaviors, and a user-specific customization of the user interface is generated based on the determined usage pattern. Note that determining the usage pattern may involve generating a directed graph in which vertices correspond to visual components in the user interface and edges between vertices correspond to user behaviors. Then, the user interface in a current release of the software is customized based on the user-specific customization. For example, the customized user interface may include: only a subset of the visual components; a different order of the visual components; and/or a visual component associated with a set of operations.

By customizing the user interface, this customization technique may increase the usefulness of the user interface (and the associated software) by reducing the time and effort of the user when using the user interface. For example, by activating the visual component the user may perform the set of operations, such as operations associated with a path through the directed graph. (This capability is sometimes referred to as a 'one-click' user experience.) Moreover, companies can readily update or modify the user interface so that it is dynamically adapted to the needs and usage pattern(s) of the user. This ease of use increases customer productivity, customer satisfaction and customer loyalty. It may also allow products to be differentiated in the marketplace, with a commensurate impact on revenue and profitability.

As an illustration, in the discussion that follows the software is financial software, such as: payroll software, accounting software, payment-processing applications and/or income-tax software. However, the customization technique may be applied in a wide variety of applications. Consequently, in other embodiments the software may be: other than financial software, a web page or website, and more generally, applications that include a user interface.

Figure 1A:
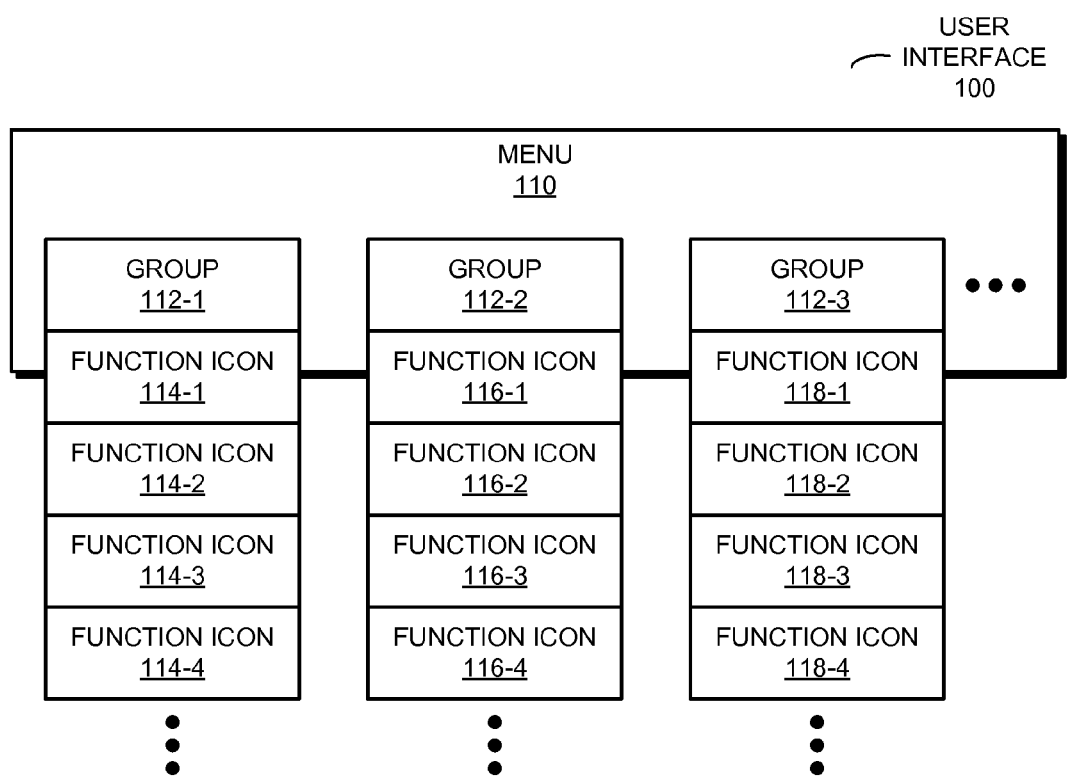
FIG. 1A is a block diagram illustrating a user interface in accordance with an embodiment of the present disclosure.

We now describe embodiments of a process for customizing a user interface. FIG. 1A presents a block diagram illustrating a user interface 100 of a software application in which there are multiple features/functions that are arranged in a menu 110 in groups 112. If a user activates or clicks on a symbol or icon for group 112-1, function icons 114 are displayed. Similarly, if the user activates or clicks on a symbol for group 112-2, function icons 116 are displayed, and if the user activates or clicks on a symbol for group 112-3, function icons 118 are displayed. However, if there are too many groups 112 and/or too many function icons 114, 116 and 118, user interface 100 may become cluttered and difficult for the user to use.

This problem can be addressed by selectively modifying the displayed content based on the user behaviors of one or more users. For example, the relevant content may be identified by monitoring user behaviors (such as using or not using particular function icons in function icons 114, 116 and 118, or an order in which function icons are activated) while the one or more users interact with user interface 100 during one or more sessions (including one or more previous sessions and/or current sessions of the one or more users). Based on the user behaviors, a usage pattern for the one or more users may be determined. For example, as described further below with reference to FIG. 3, a directed graph, which includes vertices corresponding to visual components (such as function icons) in user interface 100, and edges corresponding to user actions, may be determined. Then, a user-specific customization of the user interface may be generated based on the usage pattern, and the user interface may be accordingly customized in a current release of the software (i.e., without requiring the user to download or install a new release or an upgrade to the software).

Figure 1B:
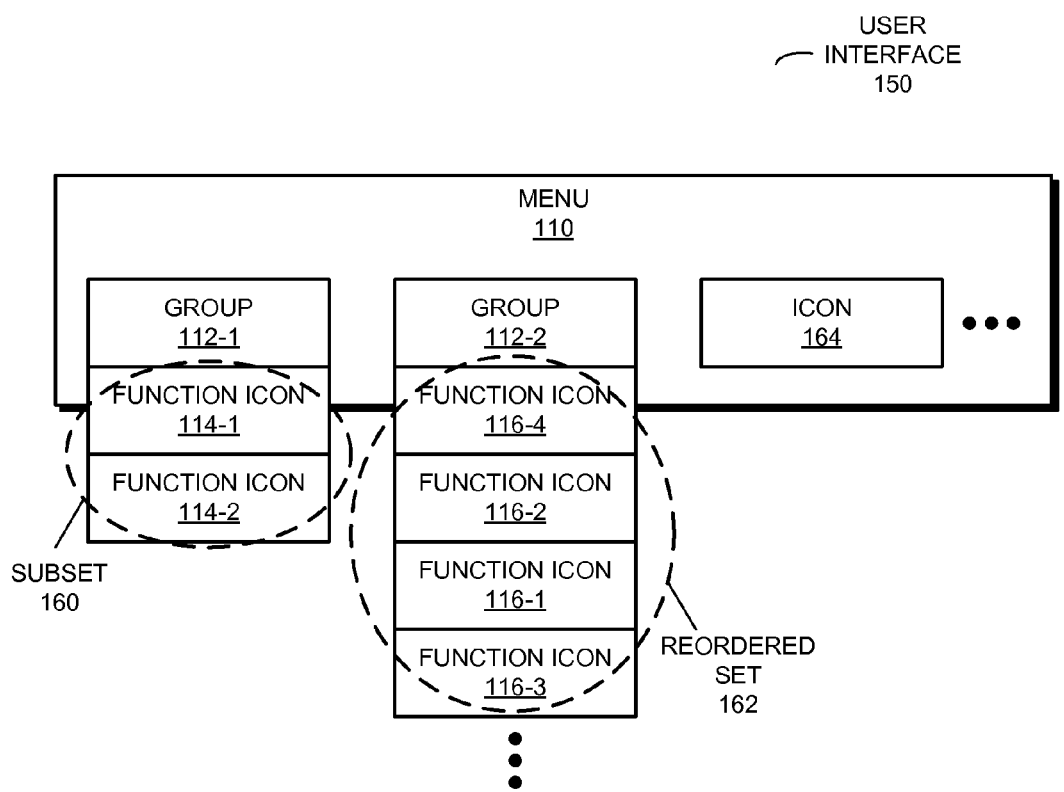
FIG. 1B is a block diagram illustrating a user interface in accordance with an embodiment of the present disclosure.

This customization is shown in FIG. 1B, which presents a block diagram illustrating a user interface 150. In this user interface, groups 112 have been modified. In particular, group 112-1 only includes a subset 160 of function icons 114. Moreover, positions of function icons 116 in group 112-2 have been changed in reordered set 162 (for example, based on their relative frequencies of use). Furthermore, function icons 118 in group 112-3 have been replaced with a single visual component, icon 164. Activating this icon, for example, by clicking on it with a mouse, may initiate an ordered set of operations that is associated with a path from a start point to an end point through the directed graph.

In some embodiments, the customization technique allows user interface 100 (FIG. 1A) to be customized for individual users (i.e., personalization). Moreover, this customization may be repeated multiple times, which allows the user interface to be dynamically adapted as the software 'learns' or identifies a user's current usage pattern. This capability may allow the software to keep track of the visual icons (such as particular function icons) of interest to the user as they evolve over time, and to maintain the usefulness of the software. However, such personalization of the user interface can be difficult, especially if it is based on very limited statistics (such as when the one user hasn't interacted with user interface 100 in FIG. 1A very often or for very long). This problem may be addressed by aggregating user behaviors for multiple users, e.g., using collaborative filtering. (Therefore, in some embodiments, the user-specific customization may be associated with a given user or the multiple users.) These users may have similar interests, e.g., as indicated in predefined user preferences, such as in user-provided metadata.

Figure 2:
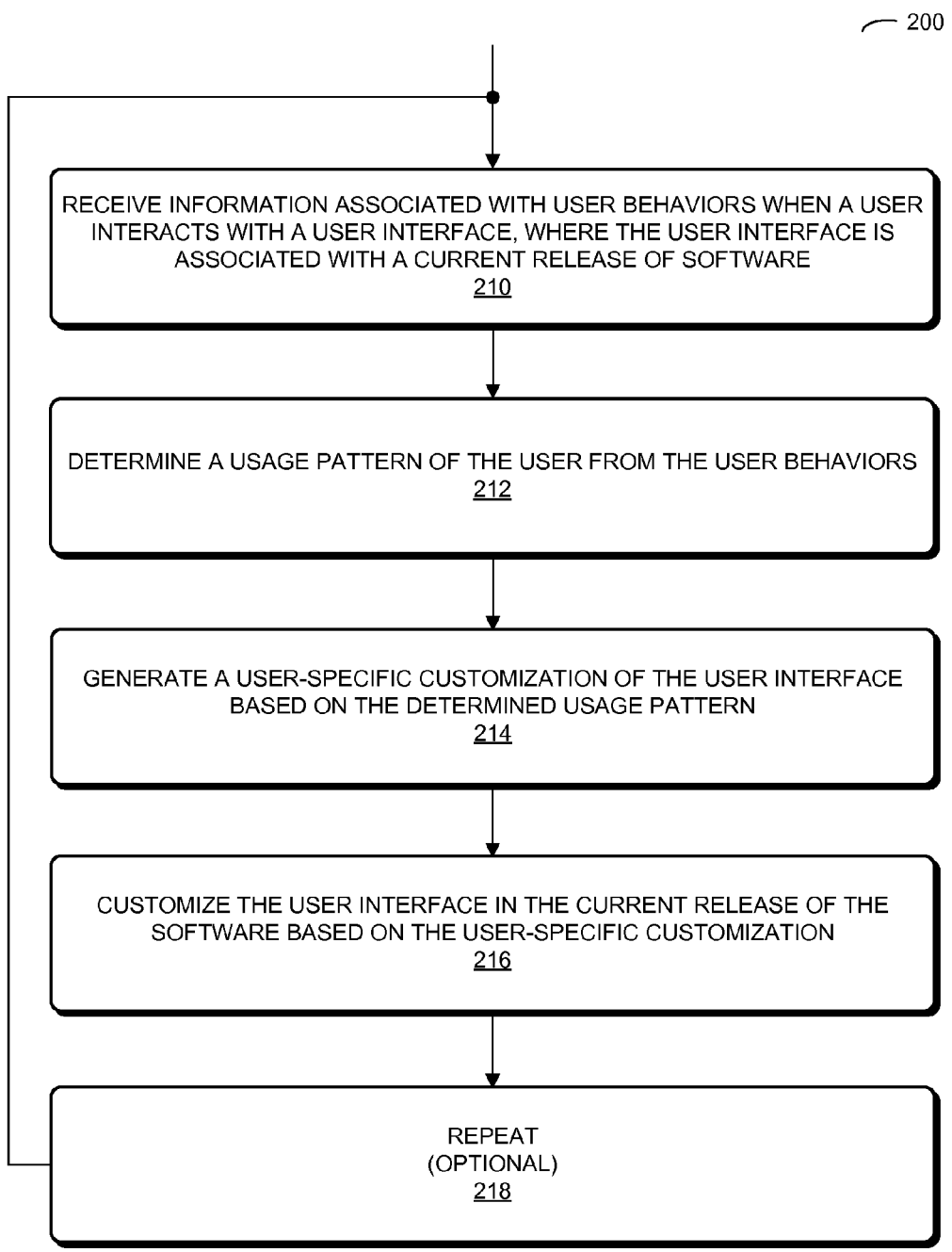
FIG. 2 is a flow chart illustrating a process for customizing the user interface of FIG. 1A in accordance with an embodiment of the present disclosure.
Figure 4:
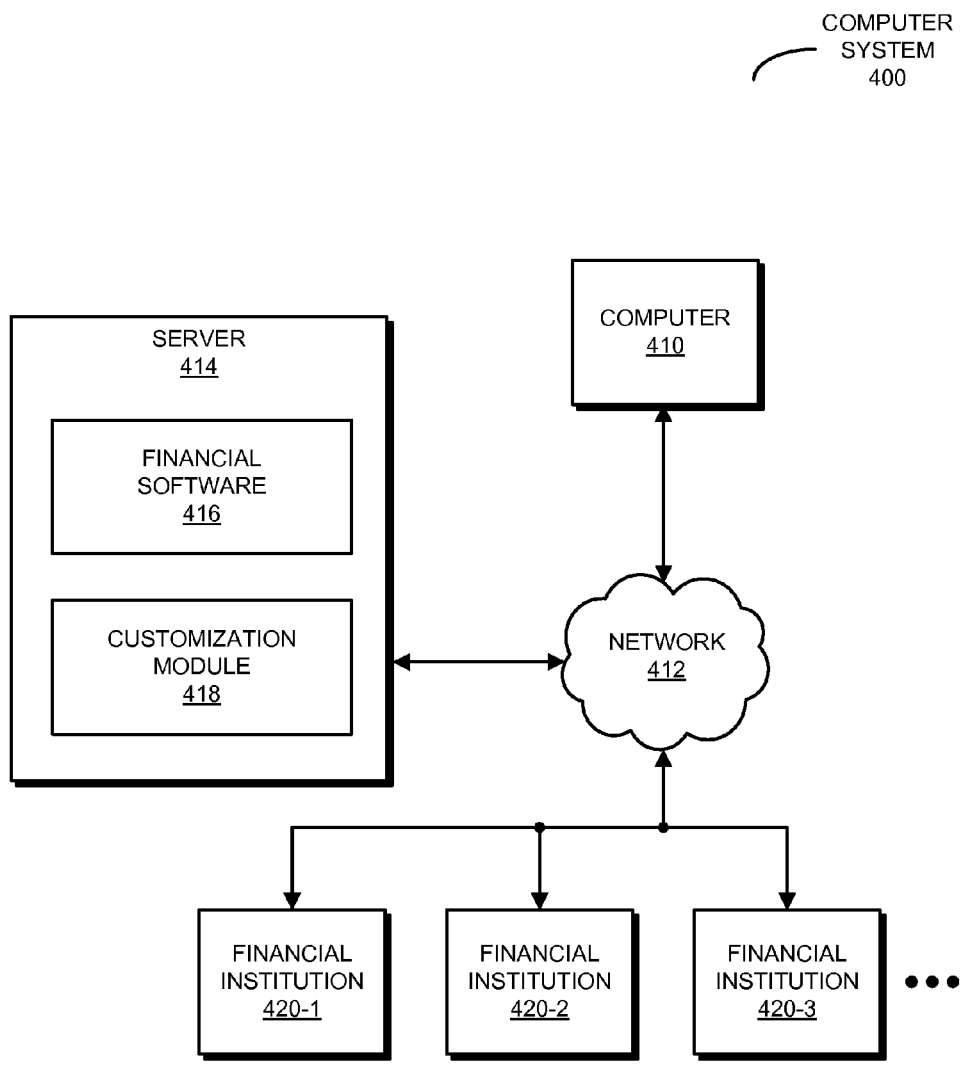
FIG. 4 is a block diagram illustrating a networked computer system that receives information associated with user behaviors and provides the customized user interface of FIG. 1B in accordance with an embodiment of the present disclosure.
Figure 5:
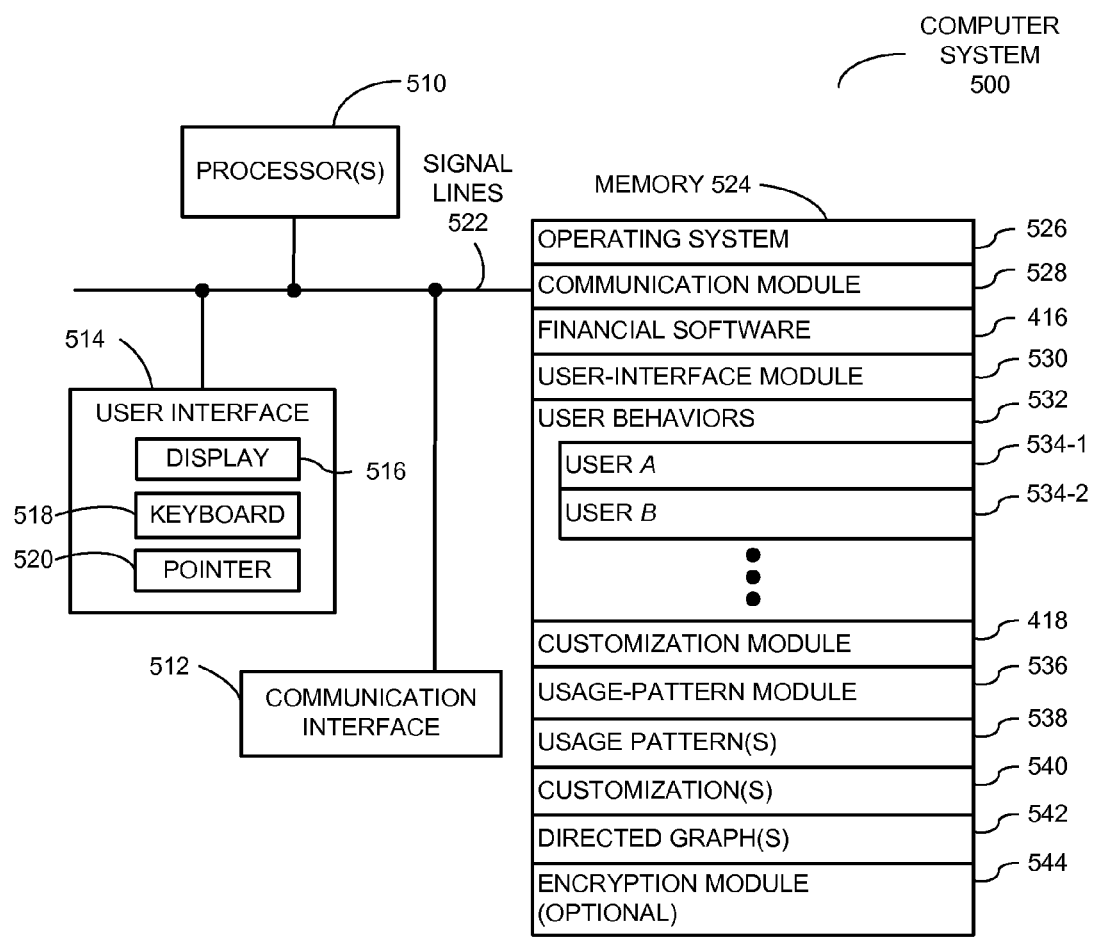
FIG. 5 is a block diagram illustrating a computer system that receives information associated with user behaviors and provides the customized user interface of FIG. 1B in accordance with an embodiment of the present disclosure.

FIG. 2 presents a flow chart illustrating a process 200 for customizing user interface 100 (FIG. 1A), which may be performed by a computer system (such as computer system 400 in FIG. 4 and/or computer system 500 in FIG. 5). During operation, the computer system receives information associated with user behaviors when a user interacts with the user interface (210), where the user interface is associated with a current release of software. Then, the computer system determines a usage pattern of the user from the user behaviors (212), and generates a user-specific customization of the user interface based on the determined usage pattern (214). Next, the computer system customizes the user interface in the current release of the software based on the user-specific customization (216).

In some embodiments of process 200, there may be additional or fewer operations. For example, operations 210-216 may be optionally repeated (218) one or more times. Moreover, the order of the operations may be changed and/or two or more operations may be combined into a single operation.

Figure 3:
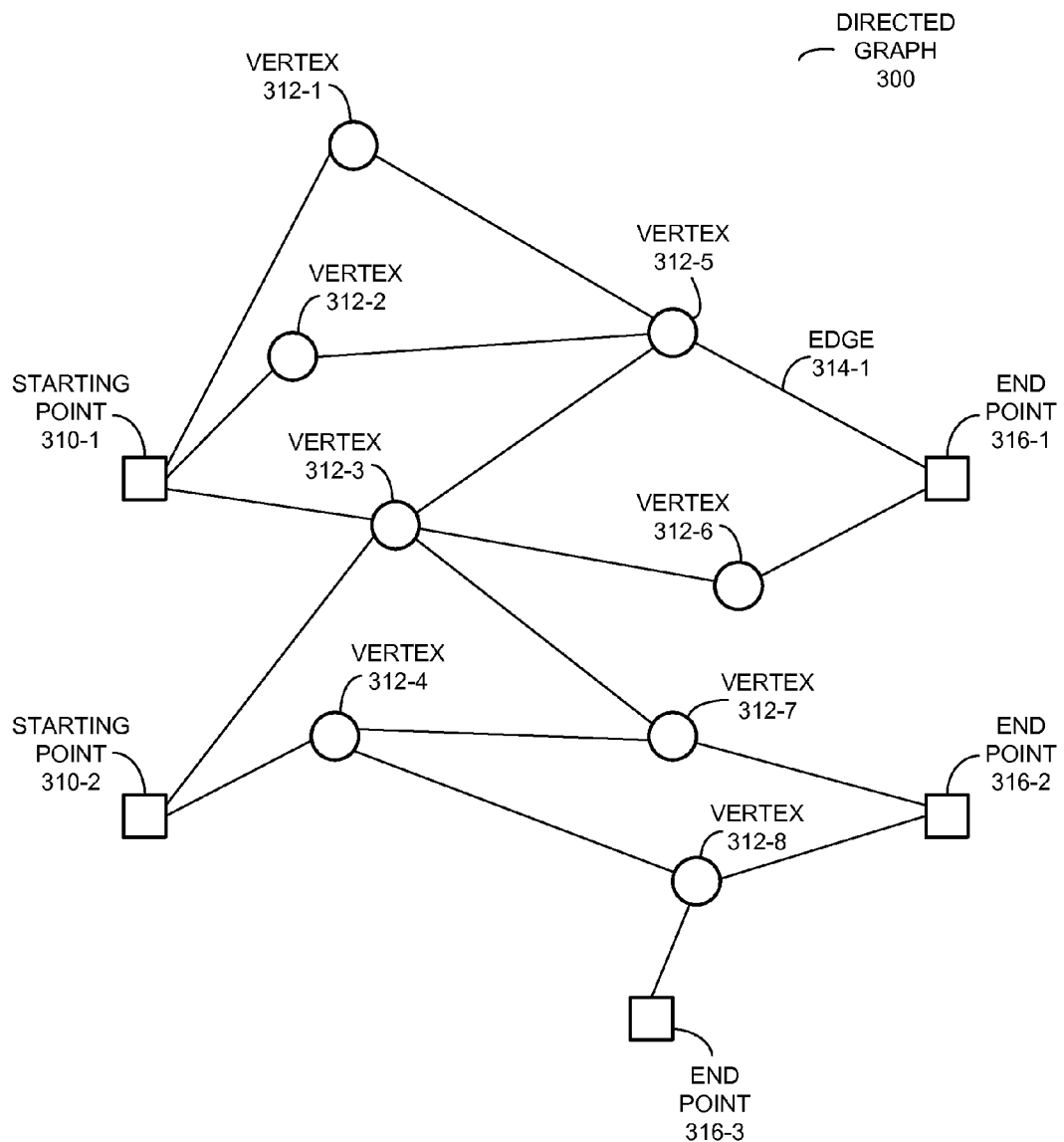
FIG. 3 is a block diagram illustrating a directed graph in accordance with an embodiment of the present disclosure.

As noted previously, in an exemplary embodiment determining the usage pattern involves determining a directed graph based on the user behavior. FIG. 3 presents a block diagram illustrating a directed graph 300. In this directed graph, visual components (such as function icons) in a user interface are represented by vertices 312. These vertices are coupled by edges 314, which represent user actions. Note that, as a user traverses a path in directed graph 300, for example, from one of start points 310 to one of end points 316, a chronological sequence of user actions may be performed using associated visual components at a subset of vertices 312. In some embodiments, edges, such as edge 314-1, are associated with weights that correspond to frequencies of use of the visual components during one or more sessions by one or more users.

Note that paths through directed graph 300 make the sequential order and the user behaviors explicit. Consequently, information in directed graph 300 may be used to generate a user-specific customization, and then to accordingly customize the user interface.

For example, once a path through directed graph 300 is identified (such as path from start point 310-1, through vertices 312-1, 312-5, 312-3 and 312-6, to end point 316-1), a shorter path may be determined (such as path from start point 310-1, through vertices 312-3 and 312-6, to end point 316-1). This 'new' path may be highlighted for the user, for example, by including an icon, such as icon 164 (FIG. 1B), which is associated with the corresponding set of operations (thereby providing a 'one-click' user experience).

Thus, directed graph 300 allows monitoring of the user's workflow, identifying a usage pattern, and customizing of the user interface to simplify the user's experience and to increase user productivity. For example, a user may perform a sequence of tasks or operations to get to a given location in directed graph 300 without realizing that there are shortcuts or faster ways to navigate through the user interface. By analyzing such repeated paths in directed graph 300, the customization technique can make such destination focal points more explicit and accessible in one of the main screens or menus in the user interface. Similarly, by monitoring the user behaviors when interacting with the user interface (and thus the software), templates or macros for the associated set of operations can be created so that the software can quickly transition to the associated end point in directed graph 300 without the user having to execute all the intermediate or intervening operations.

Alternatively or additionally, a subset of the visual components may be identified, and only these visual components may be presented to a given user of the user interface. Similarly, an order of the presented visual icons may be changed (i.e., the relative positions of the visual icons may be changed). For example, the order may be based on the frequencies of use and/or the chronological sequence of user actions in one or more paths through directed graph 300.

In some embodiments, the usage pattern is determined using a supervised learning technique. Furthermore, customizing of the user interface may be facilitated by abstracting the user interface to a different layer in software. In this way, the user interface may be adapted to the needs of a given user without waiting for a subsequent release of the software (i.e., the changes to the user interface may be dynamically implemented in a current software release).

In an exemplary embodiment, a workflow that includes a high-level domain concept, e.g., an 'Accounts Receivable Detail Report by Aging Method for the current Fiscal Year,' is captured by power users and/or domain experts, and is shared as a template with other users using one or more social networks, etc. This approach makes any advanced, hidden or complicated features more accessible to new users. In addition, it allows people with more product-related domain knowledge, e.g., accounting, to educate other users who are new to the field. Because the workflow components in a product are captured, this approach also allows the product team: learn the semantics associated with the higher-level domain concepts; map the higher-level domain concepts to real instances of action within the product; and, thus, improve the in-product help.

Note that the capture of the workflows may be dynamic and context-specific. In particular, 'dynamic' should be understood to include changing, as usage patterns change over time, the rankings of the observed paths that are used to perform a task and the composition of the workflows. For example, if a user aggregated a list of all clients who owe $5000 or more using a long sequence of operations in an account balance sheet report, the product can suggest a better way of doing this (i.e., a shorter sequence of operations). Furthermore, if the user subsequently changes the definition to aggregate a list of all clients who owe $10,000 or more or stops performing this type of analysis, the product may remove a 'shortcut' that was created for this purpose. This customization technique may also prevent duplicate functionality or icons.

Additionally, 'context' should be understood to mean that the product can learn the usage patterns of different users (or different user roles), and can react independently to these usage patterns. Context may also be determined using other parameters, such as: the time of the year, a transaction volume, a current state and position of the user in the product, etc.

In some embodiments, the paths that are captured and selected to accomplish a workflow may be statistically derived from the least-common denominator of the usage sub-graphs defined by user actions. Because user-interface components tend to be concentric in nature, in which one component may contain several others and so forth (e.g. a window may include menus, which in turn contain menu items), the recording and presentation of the path to accomplish a given workflow may be multiplicative in nature (because a user can move from one edge to n·p edges in the next n actions and p components). Consequently, the presentation of the recorded paths may be sensitive to the granularity of the user-interface component currently active (or based on the usage graph that is most likely to be active or used), as well as what is relevant at a particular level in a component. One way to accomplish this is to present the recorded workflows in a facetted tree structure that opens up to all the recorded outgoing options from a user-interface element (such as an icon) based on a user action (such as a mouse over), for example, using a lookup facetted search. In this way, the tree of options from the current state may be exposed stage-wise without becoming overwhelming.

We now describe embodiments of a computer system that performs process 200. FIG. 4 presents a block diagram illustrating a networked computer system 400 that receives information associated with user behaviors and provides customized user interface 150 (FIG. 1B). In this computer system, a user of computer 410 may use financial software. This financial software may be a stand-alone application or a portion of another application that is resident on and which executes on computer 410. Alternatively and/or additionally, at least a portion of the financial software may be a financial-software application tool (provided by server 414 via network 412) that is embedded in a web page (and which executes in a virtual environment of a web browser). In an illustrative embodiment, the software-application tool is a software package written in: JavaScript™ (a trademark of Sun Microsystems, Inc.), e.g., the software-application tool includes programs or procedures containing JavaScript instructions, ECMAScript (the specification for which is published by the European Computer Manufacturers Association International), VBScript™ (a trademark of Microsoft, Inc.) or any other client-side scripting language. In other words, the embedded software-application tool may include programs or procedures containing: JavaScript, ECMAScript instructions, VBScript instructions, or instructions in another programming language suitable for rendering by the web browser or another client application on computer 410. As an illustration, in FIG. 4 financial software 416 is shown on server 414 (i.e., a client-server architecture).

While using the financial software (for example, to conduct financial transactions with financial institutions 420), user behaviors while a user interacts with a user interface in financial software 416 may be monitored by customization module 418, which is resident on and which executes on server 414. Over time, computer 410 (if the financial software is resident on computer 410) and/or server 414 (if the software application is implemented as a software-application tool) may monitor and aggregate a log of user activities and behaviors. As noted previously, this log may include the activities of one or more users (on multiple computers, such as computer 410). Furthermore, the user behavior may be associated with one or more user interfaces in one or more software applications (which may include the financial software).

Using the monitored user behaviors, customization module 418 may determine a usage pattern (for example, based on a directed graph) and may generate a user-specific customization of the user interface. Then, customization module 418 may provide the customized user interface, which is based on the user-specific customization, to the user of computer 410 via network 412 (for example, server 414 may provide instructions to the software tool, such as instructions for a revised web page that includes the customized user interface).

Computer 410 and/or server 414 may continue to monitor user behaviors after the user interface is customized. In this way, computer system 400 can continue to 'learn' what portion of the content associated with the financial software is relevant or of interest to users, and can revise or update the user interface as the user behaviors evolve or change by providing additional instructions or another revised web page to computer 410.

Note that the log and/or the customization information may be stored on server 414 and/or at one or more other locations in computer system 400 (i.e., locally or remotely). Moreover, because this information may be sensitive in nature, it may be encrypted. For example, stored information and/or information communicated via network 412 may be encrypted.

Electronic devices and servers in computer system 400 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 412 may include: the Internet, World Wide Web (WWW), an intranet, LAN, WAN, MAN, or a combination of networks, or other technology enabling communication between computing systems.

In exemplary embodiments, the financial software includes: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial software may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), and/or other payroll or accounting software capable of processing payroll information.

FIG. 5 presents a block diagram illustrating a computer system 500 that receives information associated with user behaviors and provides customized user interface 150 (FIG. 1B). Computer system 500 includes one or more processors 510, a communication interface 512, a user interface 514, and one or more signal lines 522 coupling these components together. Note that the one or more processing units 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in the computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to the computer system 500. While not shown in FIG. 5, memory 524 may include a web browser.

Memory 524 may also include multiple program modules (or sets of instructions), including: financial software 416 (or a set of instructions), user-interface module 530 (or a set of instructions), customization module 418 (or a set of instructions), usage-pattern module 536 and/or optional encryption module 544 (or a set of instructions). Note that one or more of these program modules (or sets of instructions) may constitute a computer-program mechanism.

As described previously, financial software 416 may receive user behaviors 532, such as user behaviors for user A 534-1 and user B 534-2, while or when these users interact with one or more user interfaces provided by user interface module 530, which is associated with or in financial software 416. Then, usage-pattern module 536 may determine one or more usage patterns 538 and/or directed graphs 542 from user behaviors 532.

Customization module 418 may use the one or more usage patterns 538 and/or directed graphs 542 to generate one or more user-specific customizations of user-interface module 530, such as one or more customizations 540. Next, user-interface module 530 provides one or more customized user interfaces to one or more users of financial software 416 based on the one or more customizations 540.

In some embodiments, at least some of the information stored in memory 524 and/or at least some of the information communicated using communication module 528 is encrypted using optional encryption module 544.

Instructions in the various modules in the memory 524 may be implemented in: a high-level procedural language, an object-oriented programming language, and/or in an assembly or machine language. Note that the programming language may be compiled or interpreted, e.g., configurable or configured, to be executed by the one or more processing units 510.

Although the computer system 500 is illustrated as having a number of discrete items, FIG. 5 is intended to be a functional description of the various features that may be present in the computer system 500 rather than a structural schematic of the embodiments described herein. In practice, and as recognized by those of ordinary skill in the art, the functions of the computer system 500 may be distributed over a large number of servers or computers, with various groups of the servers or computers performing particular subsets of the functions. In some embodiments, some or all of the functionality of the computer system 500 may be implemented in one or more application-specific integrated circuits (ASICs) and/or one or more digital signal processors (DSPs).

User interface 100 (FIG. 1A), user interface 150 (FIG. 1B), directed graph 300 (FIG. 3), computer system 400 (FIG. 4) and/or computer system 500 may include fewer components or additional components. Moreover, two or more components may be combined into a single component, and/or a position of one or more components may be changed. In some embodiments, the functionality of the computer system 500 may be implemented more in hardware and less in software, or less in hardware and more in software, as is known in the art.

Figure 6:
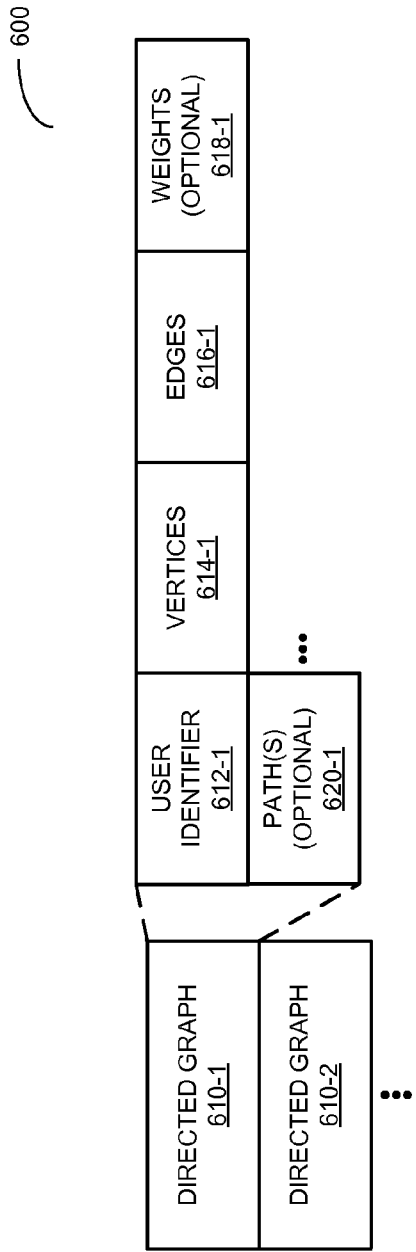
FIG. 6 is a block diagram illustrating a data structure for use in the computer systems of FIGS. 4 and 5 in accordance with an embodiment of the present disclosure.

We now discuss a data structure that may be used in computer systems 400 (FIG. 4) and 500. FIG. 6 presents a block diagram illustrating a data structure 600. This data structure may include directed graphs 610 that were determined based on user behaviors while one or more users used a user interface. For example, directed graph 610-1 for a user may include: a user identifier 612-1 (such as a user name), vertices 614-1 (which are associated with visual icons in the user interface, such as one or more function icons), edges 616-1 (which are associated with user actions or behaviors, such as transition from one vertex to another vertex), one or more optional weights 618-1 associated with corresponding edges 616-1 (such as relative frequencies of use by one or more users during one or more sessions), and/or one or more optional paths 620-1 through directed graph 610-1.

Figure 7:
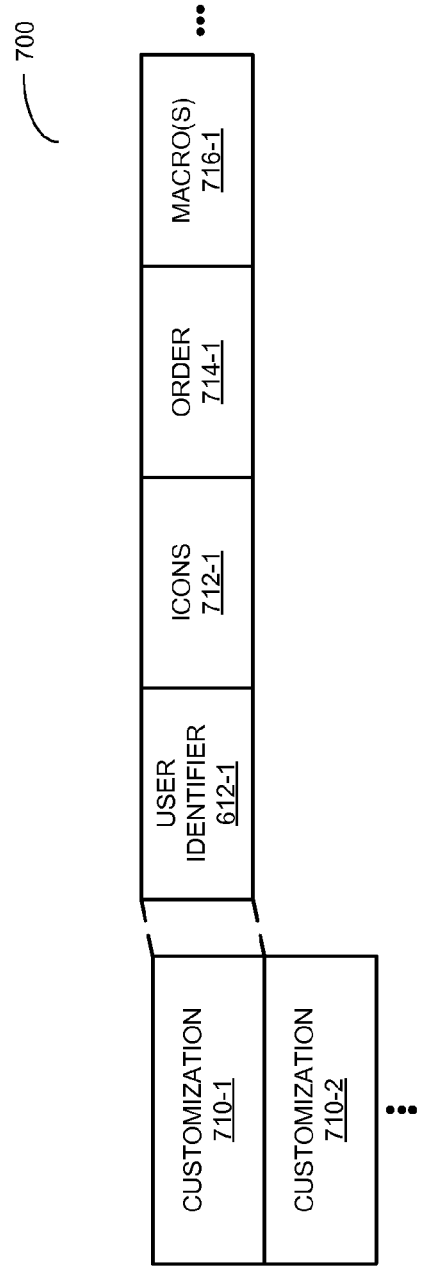
FIG. 7 is a block diagram illustrating a data structure for use in the computer systems of FIGS. 4 and 5 in accordance with an embodiment of the present disclosure.

FIG. 7 presents a block diagram illustrating a data structure 700. This data structure may include customizations 710 of the user interface. For example, customization 710-1 may include: user identifier 612-1, a subset of icons 712-1 that are to be presented in the user interface to a user, a relative order 714-1 of icons 712-1, and/or one or more macros 716-1 (or sets of operations) that each may be associated with a given icon in the user interface (such as icon 164 in FIG. 1B).

In some embodiments of data structures 600 (FIG. 6) and 700, there are fewer or additional components. Moreover, two or more components may be combined into a single component and/or a position of one or more components may be changed.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A computer-implemented method for customizing a user interface, comprising:
   receiving information associated with behaviors for a set of users when each user interacts with the user interface, wherein, for each user in the set, the information associated with the behavior for the user describes a set of functions of the user interface that are used by the user;
   recording the behaviors for the set of users using a directed graph, wherein recording the behaviors for the set of users comprises using the directed graph to aggregate the received information, wherein vertices in the directed graph correspond to visual components in the user interface, and wherein edges in the directed graph that are between the vertices correspond to actions taken by the set of users by using the visual components;
   determining a usage pattern from the recorded behaviors for the set of users, wherein said determining comprises identifying at least one path in the directed graph that corresponds to a sequence of actions taken by the set of users by using visual components;
   generating a user-specific customization of the user interface based on the determined usage pattern, wherein said generating comprises creating a function that performs the sequence of actions; and
   customizing the user interface based on the user-specific customization, wherein said customization comprises adding a visual component to the user interface that corresponds to the function.

2. The method of claim 1, wherein the user behaviors occur during multiple sessions in which the user interacts with the user interface.

3. The method of claim 1, wherein determining the usage pattern comprises using the directed graph to identify a path from a start point in the graph corresponding to a visual component for the user interface to an end point in the graph corresponding to different visual component for the user interface,
   wherein generating the user-specific customization comprises determining a shorter path in the graph from the start point to the end point, and
   wherein customizing the user interface comprises using the user interface to present a visual component for the shorter path, wherein, when activated, the visual component for the shorter path performs a set of operations from the start point to the end point that use the shorter path.

4. The method of claim 1, wherein generating a user-specific customization of the user interface comprises:
   determining that an interaction with the user interface for a given user of the user interface is below a predetermined level; and
   generating a user-specific customization of the user interface for the given user based on the determined usage pattern for users other than the given user.

5. The method of claim 1, wherein, when a given user in the set of users interacts with the user interface by taking an action that involves using a given set of the visual components, recording the behaviors for the given user using the directed graph comprises generating a path in the directed graph that begins at a starting vertex in the vertices and ends at an ending vertex in the vertices, wherein the starting vertex corresponds to a visual component in the given set of visual components that the user uses first while taking the action, wherein the ending vertex corresponds to a visual component in the given set of visual components that the user uses last while taking the action, and wherein the path traverses vertices that correspond to other visual components in the given set of visual components in a same order as a chronological order in which the user used the other visual components while taking the action.

6. The method of claim 1, wherein recording the user behaviors comprises generating the directed graph.

7. The method of claim 6, wherein the directed graph includes weights associated with at least some of the edges; and wherein a given weight indicates a frequency of a user behavior corresponding to a given edge in one or more sessions during which the user interacts with the user interface.

8. The method of claim 6, wherein determining the usage pattern involves identifying one or more paths through the directed graph; and wherein a given path starts at a first vertex and ends at a second vertex.

9. The method of claim 6, wherein, for each user in the set, the information associated with the behavior for the user is collected at a client computer for the user and sent to a server computer, wherein the aggregating the received information, the generating the directed graph, the determining the usage pattern, and the generating the user-specific customization are performed at the server, and wherein customizing the user interface comprises, for each user in the set, customizing the user interface at the client computer for the user by receiving the user-specific customization from the server at the client computer.

10. The method of claim 6, wherein generating the user-specific customization involves selecting a subset of the visual components in the directed graph that includes one or more visual components; and wherein customizing the user interface involves presenting the selected subset of the visual components and excluding the remaining visual components in the directed graph.

11. The method of claim 10, wherein an order of the presented subset of the visual components is based on frequencies of use, by the user, of the visual components.

12. The method of claim 10, wherein an order of the presented subset of the visual components is based on an order of usage of the visual components in one or more paths through the directed graph; and wherein a given path starts at a first vertex and ends at a second vertex.

13. The method of claim 6, wherein generating the user-specific customization involves selecting a subset of the visual components in the directed graph that includes one or more visual components; and wherein customizing the user interface involves changing positions in the user interface of the selected subset of the visual components.

14. The method of claim 13, wherein an order of the presented subset of the visual components is based on frequencies of use, by the user, of the visual components.

15. The method of claim 13, wherein an order of the presented subset of the visual components is based on an order of usage of the visual components in one or more paths through the directed graph; and wherein a given path starts at a first vertex and ends at a second vertex.

16. A computer-program product for use in conjunction with a computer system, the computer-program product comprising a non-transitory computer-readable storage medium and a computer-program mechanism embedded therein for customizing a user interface, the computer-program mechanism including:

instructions for receiving information associated with behaviors for a set of users when each user interacts with the user interface, wherein, for each user in the set, the information associated with the behavior for the user describes a set of functions of the user interface that are used by the user;

instructions for recording the behaviors for the set of users using a directed graph, wherein recording the behaviors for the set of users comprises using the directed graph to aggregate the received information, wherein vertices in the directed graph correspond to visual components in the user interface, and wherein edges in the directed graph that are between the vertices correspond to actions taken by the set of users by using the visual components;

instructions for determining a usage pattern from the recorded behaviors for the set of users, wherein said determining comprises identifying at least one path in the directed graph that corresponds to a sequence of actions taken by the set of users by using visual components;

instructions for generating a user-specific customization of the user interface based on the determined usage pattern, wherein said generating comprises creating a function that performs the sequence of actions; and instructions for customizing the user interface based on the user-specific customization, wherein said customization comprises adding a visual component to the user interface that corresponds to the function.

17. The computer-program product of claim 16, wherein recording the user behaviors comprises generating the directed graph.

18. The computer-program product of claim 17, wherein the directed graph includes weights associated with at least some of the edges; and wherein a given weight indicates a frequency of a user behavior corresponding to a given edge in one or more sessions during which the user interacts with the user interface.

19. The computer-program product of claim 17, wherein determining the usage pattern involves identifying one or more paths through the directed graph; and wherein a given path starts at a first vertex and ends at a second vertex.

20. The computer-program product of claim 17, wherein generating the user-specific customization involves selecting a subset of the visual components in the directed graph that includes one or more visual components; and wherein customizing the user interface involves presenting the selected subset of the visual components and excluding the remaining visual components in the directed graph.

21. The computer-program product of claim 17, wherein generating the user-specific customization involves selecting a subset of the visual components in the directed graph that includes one or more visual components; and wherein customizing the user interface involves changing positions in the user interface of the selected subset of the visual components.

22. A computer system, comprising:
a processor;
non-transitory memory; and
a program module, wherein the program module is stored in the memory and configurable to be executed by the processor to configure a user interface, the program module including:
  instructions for receiving information associated with behaviors for a set of users when each user interacts with the user interface, wherein, for each user in the set, the information associated with the behavior for the user describes a set of functions of the user interface that are used by the user;
  instructions for recording the behaviors for the set of users using a directed graph, wherein recording the behaviors for the set of users comprises using the directed graph to aggregate the received information, wherein vertices in the directed graph correspond to visual components in the user interface, and wherein edges in the directed graph that are between the vertices correspond to actions taken by the set of users by using the visual components;
  instructions for determining a usage pattern from the user behaviors for the set of users, wherein said determining comprises identifying at least one path in the directed graph that corresponds to a sequence of actions taken by the set of users by using visual components;
  instructions for generating a user-specific customization of the user interface based on the determined usage pattern, wherein said generating comprises creating a function that performs the sequence of actions; and
  instructions for customizing the user interface based on the user-specific customization, wherein said customization comprises adding a visual component to the user interface that corresponds to the function.

* * * * *